United States Patent
Jin (10) Patent No.: US 10,300,909 B2
(45) Date of Patent: May 28, 2019

(54) APPARATUS AND METHOD FOR CONTROLLING STARTUP OF ENGINE

(71) Applicant: HYUNDAI MOTOR COMPANY, Seoul (KR)

(72) Inventor: Jeong-Sik Jin, Ansan-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 75 days.

(21) Appl. No.: 15/281,941

(22) Filed: Sep. 30, 2016

(65) Prior Publication Data

US 2017/0166198 A1 Jun. 15, 2017

(30) Foreign Application Priority Data

Dec. 10, 2015 (KR) .................. 10-2015-0175810

(51) Int. Cl.
*B60W 20/40* (2016.01)
*B60K 6/24* (2007.10)
(Continued)

(52) U.S. Cl.
CPC .............. *B60W 20/40* (2013.01); *B60K 6/24* (2013.01); *B60W 20/50* (2013.01); *B60W 50/14* (2013.01); *F02D 41/0097* (2013.01); *F02D 41/062* (2013.01); *F02D 41/22* (2013.01); *F02D 41/26* (2013.01); *F02D 41/30* (2013.01); *F02D 41/3005* (2013.01); *F02N 11/0803* (2013.01); *F02P 15/12* (2013.01); *B60W 2510/06* (2013.01); *B60W 2510/0676* (2013.01); *B60W 2540/06* (2013.01); *B60W 2710/06* (2013.01); *B60Y 2300/436* (2013.01); *B60Y 2400/112* (2013.01); *B60Y 2400/43* (2013.01);
(Continued)

(58) Field of Classification Search
None
See application file for complete search history.

(56) References Cited

U.S. PATENT DOCUMENTS 9,205,834 B1 * 12/2015 Uehara ................ B60W 20/50
9,738,274 B2 * 8/2017 Mitsutani ............. B60W 20/50
(Continued)

FOREIGN PATENT DOCUMENTS

| JP | 63-026451 A | 2/1988 |
|---|---|---|
| JP | 2001-214779 A | 8/2001 |

(Continued)

*Primary Examiner* — Mussa A Shaawat
*Assistant Examiner* — Abdhesh K Jha
(74) *Attorney, Agent, or Firm* — Morgan Lewis & Bockius LLP (57) ABSTRACT

An apparatus for controlling a startup of an engine includes an engine, an engine controller configured to check whether the startup of the engine is prepared to generate information on whether the startup is prepared when an ignition is turned on, a hybrid controller configured to check whether communication with the engine controller is normal and to generate information on whether the hybrid controller is normal, the hybrid controller causing a vehicle to be driven only in an EV mode or generating a start control signal for the startup of the engine, according to whether the EV mode is engaged when a start signal is input from a driver, and a starter driver configured to start the engine in response to the start control signal.

19 Claims, 6 Drawing Sheets

(51) Int. Cl.
*B60W 50/14* (2012.01)
*B60W 20/50* (2016.01)
*F02D 41/00* (2006.01)
*F02D 41/26* (2006.01)
*F02D 41/30* (2006.01)
*F02N 11/08* (2006.01)
*F02P 15/12* (2006.01)
*F02D 41/06* (2006.01)
*F02D 41/22* (2006.01)

(52) U.S. Cl.
CPC .... *F02D 2041/228* (2013.01); *F02N 2200/04* (2013.01); *F02N 2300/304* (2013.01); *Y10S 903/905* (2013.01)

(56) References Cited

U.S. PATENT DOCUMENTS

2013/0226389 A1* 8/2013 Yamazaki ............. B60K 6/445
                                                            701/22
2015/0330354 A1* 11/2015 Choi ...................... F02P 19/02
                                                           123/558
2016/0290305 A1* 10/2016 Kinoshita ........... F02N 11/0866

FOREIGN PATENT DOCUMENTS

| | | | |
|---|---|---|---|
| JP | 2001-227438 A | | 8/2001 |
| JP | 2004-339943 A | | 12/2004 |
| JP | 2005-155582 A | | 6/2005 |
| JP | 2006336521 A | * | 12/2006 |
| JP | 2006336521 A | | 12/2006 |
| JP | 2007-168564 A | | 7/2007 |
| JP | 2008-213781 A | | 9/2008 |
| JP | 2015-067008 A | | 4/2015 |
| KR | 10-2008-0035262 A | | 4/2008 |
| KR | 10-1519789 B1 | | 5/2015 |

* cited by examiner

APPARATUS AND METHOD FOR CONTROLLING STARTUP OF ENGINE

CROSS-REFERENCE TO RELATED APPLICATION

This application claims the benefit of priority to Korean Patent Application No. 10-2015-0175810, filed on Dec. 10, 2015 with the Korean Intellectual Property Office, the entirety of which is incorporated herein by reference.

TECHNICAL FIELD

Exemplary embodiments in the present disclosure relate to a technique for starting an engine; and, particularly, to an apparatus and method for controlling the startup of an engine, which are provided to perform cooperative control between a hybrid controller that controls a vehicle and individual controllers for dependently controlling the vehicle by executing the startup sequence therebetween.

BACKGROUND

Hybrid vehicles are vehicles using two or more power sources, and are generally referred to as HEVs (Hybrid Electric Vehicles) driven using an engine and a motor.

In recent years, in order to meet current demands for improving fuel efficiency and developing eco-friendly vehicles, research into hybrid electric vehicles is actively ongoing.

Such a hybrid vehicle may take a variety of structures using an engine and an electric motor as power sources, and most vehicles which have been researched up to now are either parallel-type vehicles or series-type vehicles.

The hybrid vehicle is typically equipped with an Hybrid Controller (HCU) for performing the overall control of the vehicle, and includes a controller for each device constituting a system.

In the hybrid vehicle, it is necessary to accurately define a startup sequence in order to cope with strict regulations of fuel economy ($CO_2$).

In addition, it is necessary to determine whether an engine start failure is caused by a starter motor or a Hybrid Starter Generator (HSG).

In addition, there is a need to perform automatic control when starting an engine in order for a driver to require little attention.

SUMMARY

An embodiment in the present disclosure is directed to an apparatus and method for controlling the startup of an engine, which are provided to accurately define a startup sequence in order to cope with strict regulations of fuel economy ($CO_2$).

Another embodiment in the present disclosure is directed to an apparatus and method for controlling startup of an engine, which are provided to determine whether an engine start failure is caused by a starter motor or an HSG.

A further embodiment in the present disclosure is directed to an apparatus and method for controlling startup of an engine, which are provided to perform automatic control when starting an engine in order for a driver to require little attention.

Other objects and advantages of the present disclosure can be understood by the following description, and become apparent with reference to the exemplary embodiments in the present disclosure. Also, it is obvious to those skilled in the art to which the present disclosure pertains that the objects and advantages in the present disclosure can be realized by the means as claimed and combinations thereof.

In accordance with an exemplary embodiment in the present disclosure, there is provided an apparatus for controlling startup of an engine, which is provided to accurately define a startup sequence in order to cope with strict regulations of fuel economy ($CO_2$).

The apparatus for controlling startup of an engine includes an engine, an engine controller configured to check whether startup of the engine is prepared to generate information on whether the startup is prepared when an ignition is turned on, a hybrid controller configured to check whether communication with the engine controller is normal and to generate information on whether the hybrid controller is normal, the hybrid controller causing a vehicle to be driven only in an EV mode or generating a start control signal for the startup of the engine according to whether the EV mode is engaged when a start signal is input from a driver, and a starter driver configured to start the engine in response to the start control signal.

When the startup of the engine is determined not to be prepared according to the information on whether the startup is prepared, and the start signal is input, the hybrid controller may cause the vehicle to be driven only in the EV mode.

The hybrid controller may turn on a malfunction indication lamp when the startup of the engine is determined to be not prepared according to the information on whether the startup is prepared.

Alternatively, the engine controller may turn on the malfunction indication lamp when the hybrid controller is determined not to be normal according to the information on whether the hybrid controller is normal.

The apparatus may further include a glow unit configured to preheat a glow plug provided in the engine for a preheating time calculated in response to the start control signal from the hybrid controller.

The starter driver may start the engine through an HSG or a starter motor.

The starter motor may be operated by control of the engine controller to start the engine, and at the same time the hybrid controller may transmit a fuel injection command to the engine controller.

When the engine is started by the HSG, the hybrid controller may transmit a fuel injection command to the engine controller when the engine reaches a predetermined RPM or more.

The engine controller may calculate the preheating time required to preheat the glow plug.

When the hybrid controller is normal and the starter motor is not operated, the HSG may be operated and the engine controller may simultaneously perform the operation of the HSG and fuel injection.

When the hybrid controller is determined not to be normal and the start signal is input, the engine controller may cause the vehicle to be driven in a limp-home mode in which the engine is idle.

In accordance with another embodiment of the present invention, a method for controlling startup of an engine includes checking whether startup of an engine is prepared by an engine controller to generate information on whether the startup is prepared, when an ignition is turned on, checking whether communication between a hybrid controller and the engine controller is normally executed, generating information on whether the hybrid controller is normal according the checked result, and determining whether a start signal is input from a driver, determining whether an EV mode is engaged when the start signal is determined to be input by the hybrid controller, driving a vehicle only in the EV mode when the EV mode is determined to be engaged in the determining whether an EV mode is engaged, generating a start control signal for starting the engine by the hybrid controller when the EV mode is determined to be not engaged in the determining whether an EV mode is engaged, and starting the engine in response to the start control signal by a starter driver.

The driving a vehicle only in the EV mode may include driving the vehicle only in the EV mode by the hybrid controller when the startup of the engine is determined not to be prepared according to the information on whether the startup is prepared and the start signal is input.

The driving a vehicle only in the EV mode may include turning on a malfunction indication lamp by the hybrid controller when the startup of the engine is determined not to be prepared according to the information on whether the startup is prepared, or turning on the malfunction indication lamp by the engine controller when the hybrid controller is determined not to be normal according to the information on whether the hybrid controller is normal.

The generating a start control signal may include preheating a glow plug provided in the engine for a preheating time calculated by a glow unit in response to the start control signal from the hybrid controller.

The checking whether startup of an engine is prepared may include calculating the preheating time required to preheat the glow plug by the engine controller.

DETAILED DESCRIPTION OF THE EMBODIMENTS

Exemplary embodiments will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present disclosure to those skilled in the art. Therefore, it should be understood that the scope and spirit of the present invention can be extended to all variations, equivalents, and replacements in addition to the appended drawings of the present invention.

Throughout the disclosure, like reference numerals refer to like parts throughout the various figures and embodiments of the present invention. Furthermore, the terms including expressions, such as first and/or second, used in the specification of the present invention may be used to describe various elements of the present invention. However, the elements of the present invention should not be limited by the terms used in the specification of the present invention. In other words, such terms will be used only to differentiate one element from other elements of the present invention.

For example, without deviating from the scope and spirit of the present invention, a first element may be referred to as a second element, and, similarly, a second element may also be referred to as a first element. As used herein, the term "and/or" includes any and all combinations of one or more of the associated listed items.

Unless otherwise defined, all terms, including technical and scientific terms, used herein have the same meaning as commonly understood by one of ordinary skill in the art.

It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, an apparatus and method for controlling startup of an engine according to an exemplary embodiment will be described below in more detail with reference to the accompanying drawings.

Figure 1:
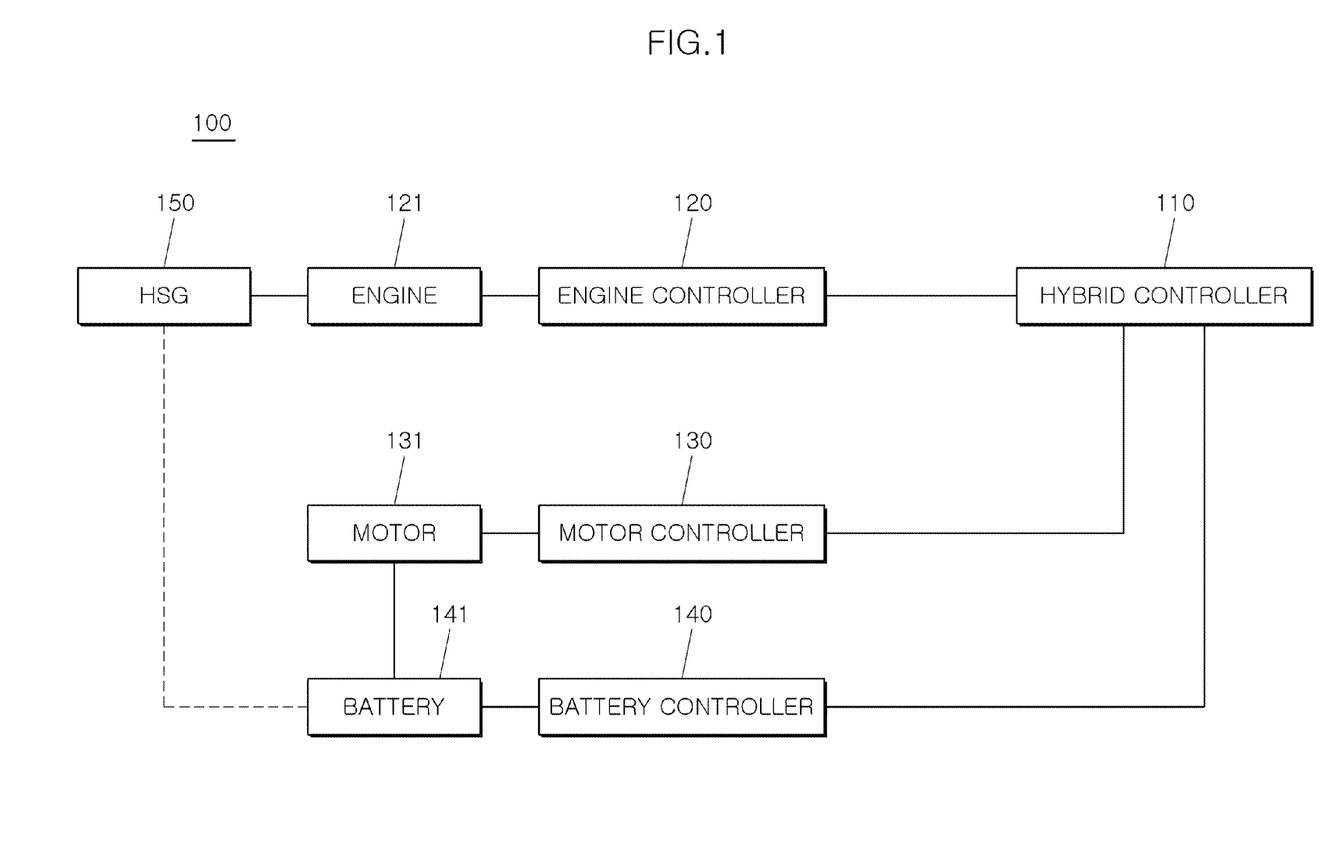
FIG. 1 is a block diagram illustrating the configuration of an engine start control apparatus according to an exemplary embodiment in the present disclosure.

FIG. 1 is a block diagram illustrating the configuration of an engine start control apparatus according to an exemplary embodiment. Referring to FIG. 1, the engine start control apparatus 100 may include an engine 121, a motor 131, a battery 141, an engine controller 120 for controlling the engine 121, a motor controller 130 for controlling the motor 131, a battery controller 140 for controlling the battery 141, and a hybrid controller 110 to perform cooperative control with the controllers 120, 130, and 140, etc.

The engine 121 is started, operated, or stopped by the control of the engine controller 120. The engine 121 may be a Continuous Variable Valve Timing (CVVT), Double Over Head Camshaft (DOHC), Continuous Valve Timing (CVT), Gasoline Direct Injection (GDI), or Multi Point Injection (MPI) engine which uses gasoline as fuel, a Common Rail Direct Injection (CRDI), High-direction Turbo Intercooler (HTI), or Variable Geometry Turbocharger (VGT) engine which uses diesel as fuel, an Liquid Propane Injection (LPI) engine which uses gas as fuel, or a diesel engine.

The engine in the exemplary embodiment is assumed to be a diesel engine which uses diesel as fuel and will be further described below.

The battery 141 is configured as a battery pack. The battery pack is configured such that battery cells (not shown) are connected in series and/or in parallel. Each of the battery cells may be a high-voltage battery for an electric vehicle, such as a nickel-metal battery, a lithium-ion battery, a lithium-polymer battery, or an all-solid battery. In general, the high-voltage battery is a battery which uses a high voltage of 100V or more as a power source for driving an electric vehicle. However, the present invention is not limited thereto, and a low-voltage battery may be used.

In addition, a Hybrid Starter Generator (HSG) 150 is provided to charge the battery 141. The HSG 150 may also be used to start the engine 121. In other words, the HSG 150 is operatively connected to the crank shaft of the engine 121 by a belt, so as to be operated as an electric motor when the engine 121 is started. The HSG 150 may also be operated as a generator when the engine 121 is driven.

In general, electric vehicles (particularly, hybrid electric vehicles) are classified into a series-type vehicle, a parallel-type vehicle, and a complex-type vehicle according to the power transfer systems of vehicles, or are classified into a soft-type vehicle, a middle-type vehicle, and a hard-type vehicle according to the share ratio of power in the engine 121 and the motor 131.

Here, the series-type vehicle has a structure similar to a typical electric vehicle, and obtains driving force from a motor, and is also equipped with an engine as a generator in order to increase the driving range of the electric vehicle. The parallel-type vehicle primarily uses the engine for travelling, and uses the motor to assist driving force when the efficiency of the engine is low, e.g. when the vehicle is driven at low speed or is accelerated.

The parallel-type vehicle may improve fuel efficiency in an overall driving system by utilizing an optimal operating region between the engine and the motor, and may improve fuel efficiency by returning power to the motor during braking.

A hybrid vehicle that includes a motor having a smaller capacity than an engine is referred to as a soft-type hybrid vehicle, whereas a hybrid vehicle including a motor having a larger capacity is referred to as a hard-type hybrid vehicle. The hard-type hybrid vehicle may realize an Electric Vehicle (EV) mode in which it is driven at low speed only by the motor.

When the driver starts the ignition, the engine controller 120 checks whether the startup of the engine 121 is feasible to generate information on whether the startup is prepared, and transmits the same to the hybrid controller 110.

The hybrid controller 110 checks whether communication with the engine controller 120 is normally feasible to generate information on whether the hybrid controller is normal, and transmits the same to the engine controller 120.

The engine controller 120 and the hybrid controller 110 exchange the information on whether the startup is prepared and the information on whether the hybrid controller is normal with each other, and perform cooperative control therebetween.

In particular, when a start signal is input to the hybrid controller 110 from the driver, the hybrid controller 110 causes the vehicle to be driven only in the EV mode or generates a start control signal for the startup of the engine, according to whether the EV mode is engaged.

The battery controller 140 serves to increase the energy efficiency of the battery 141 and lengthen the life thereof by optimizing the management of the battery 141. To this end, the battery controller 140 performs a function of increasing the safety and reliability of the battery by monitoring the voltage, current, and/or temperature of the battery 141 in real time and preventing the excessive charge and/or discharge of the battery.

The controllers 110, 120, 130, and 140 are connected to the hybrid controller 110 through a high-speed Controller Area Network (CAN) communication line (e.g. 500 kbps), a Flexible Data-Rate (CAN-FD) communication line, a FlexRay communication line, a Local Interconnect Network (LIN) communication line, a Power Line Communication (PLC) line, or a Control Pilot (CP) communication line, and commands are transferred from a high controller to sub controllers while the controllers exchange information with each other. In the electric vehicle, the hybrid controller 110 is set as a high controller, and the controllers 120, 130, and 140 including the hybrid controller 110 perform cooperative control therebetween. The above controllers are given by way of example for the sake of convenience in the embodiment, and the electric vehicle may include a Transmission Controller (TCU), a Power Controller (PCU), a Tire Pressure Monitoring System (TPMS), a Motor-Driven Power Steering (MDPS), etc.

Figure 2:
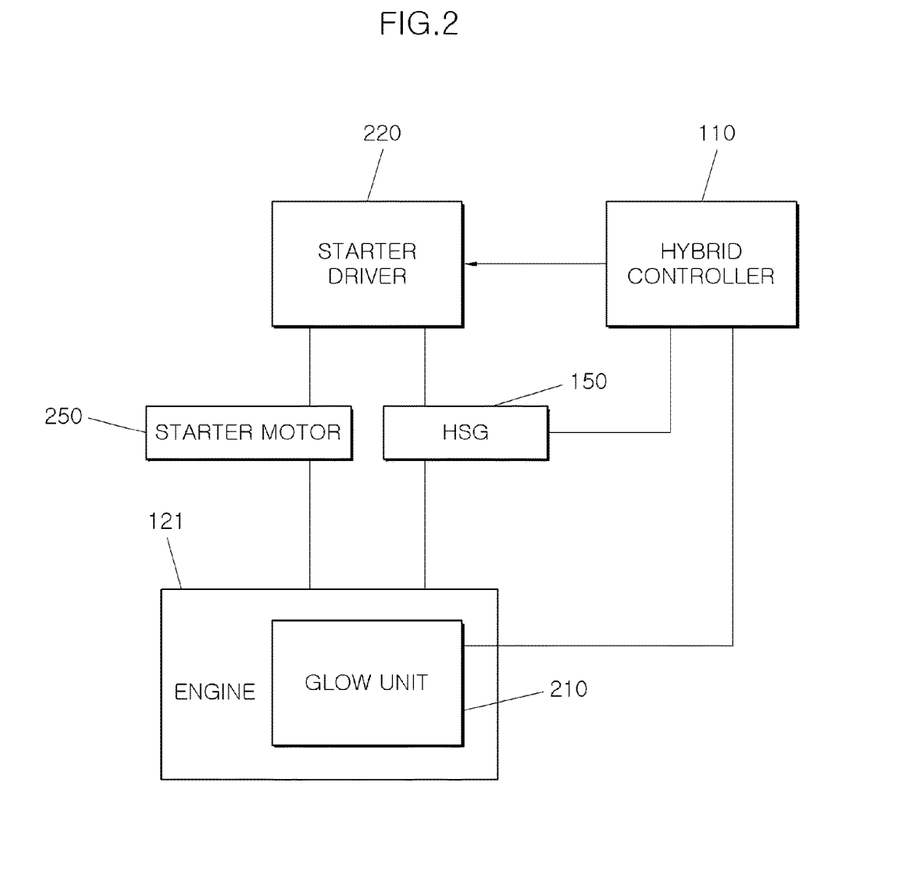
FIG. 2 is a conceptual block diagram illustrating a relationship between an engine controller and a glow unit provided in an engine illustrated in FIG. 1.

FIG. 2 is a conceptual block diagram illustrating a relationship between the engine controller and a glow unit provided in the engine 121 illustrated in FIG. 1. Particularly, FIG. 2 is a conceptual block diagram illustrating that the engine 121 is a glow engine. Referring to FIG. 2, the engine start control apparatus includes a glow unit 210 which preheats a glow plug (not shown) provided in the engine for a preheating time calculated according to the start control signal from the hybrid controller (110 in FIG. 1). Although the glow unit 210 is illustrated to be provided inside the engine 121 for the sake of convenience in FIG. 2, the glow unit 210 may be provided outside or inside the engine 121.

In addition, the engine start control apparatus may include a starter motor 250 to start the engine 121. The starter motor 250 is used when the engine is not started by the HSG 150. That is, when the HSG 150 breaks down, the starter motor 250 is used. In this case, the engine controller 120 drives the starter motor 250 by itself.

Accordingly, when the starter motor 250 is operated through the control of the engine controller 120 to start the engine 121, the hybrid controller 110 transmits a fuel injection command for injecting fuel into the engine 121 to the engine controller 120.

The engine start control apparatus may be configured such that the engine is started only by the HSG 150 without the starter motor 250.

A starter driver 220 starts the engine 121 through the HSG 150 or the starter motor 250 by the control of the engine controller 120 and/or the hybrid controller 110.

In addition, the engine controller 120 calculates the preheating time required to preheat the glow plug using the glow unit 210.

Figure 3A:
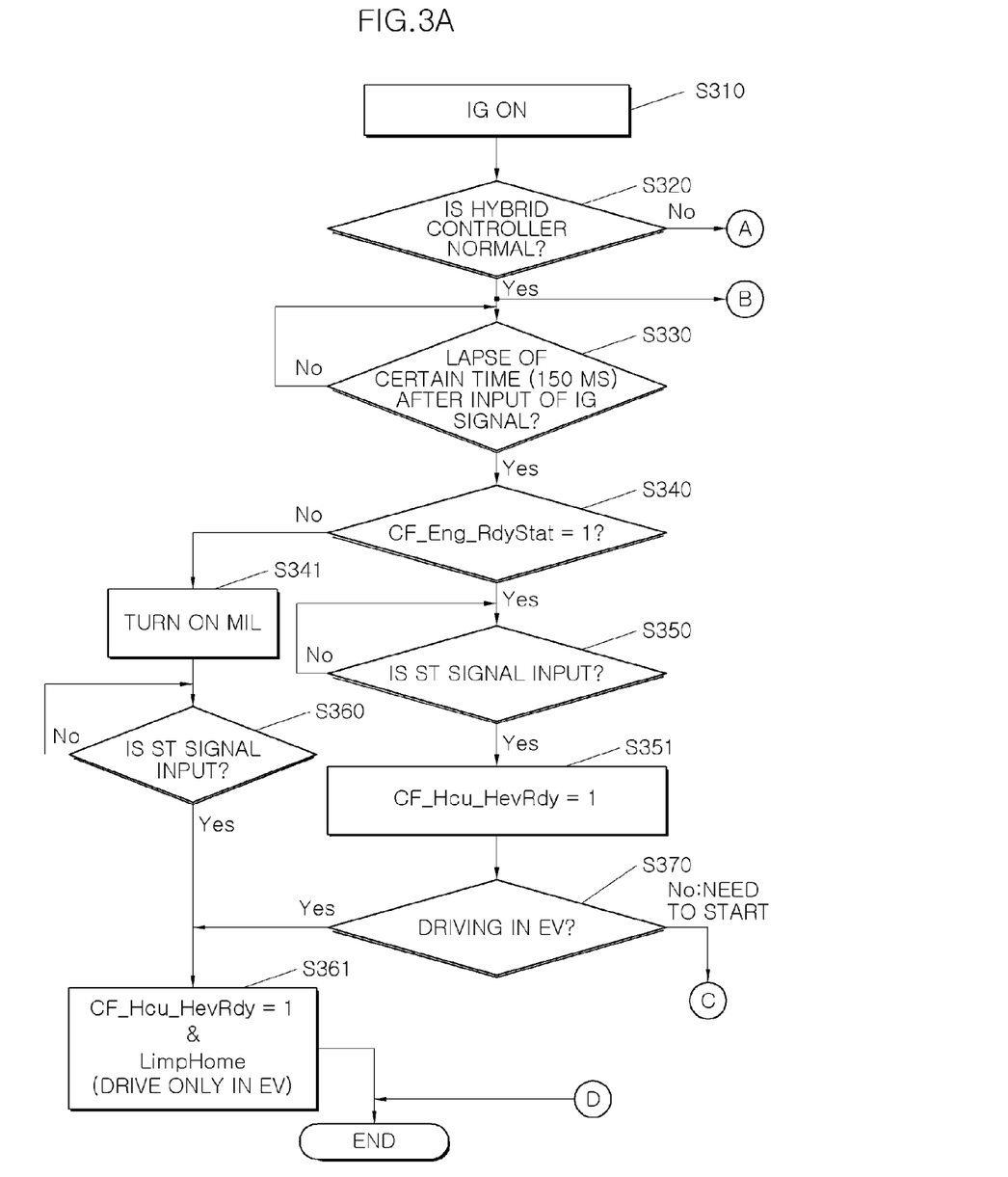
FIGS. 3A and 3B are flowcharts illustrating an engine start process performed by a hybrid controller illustrated in FIG. 1.
Figure 3B:
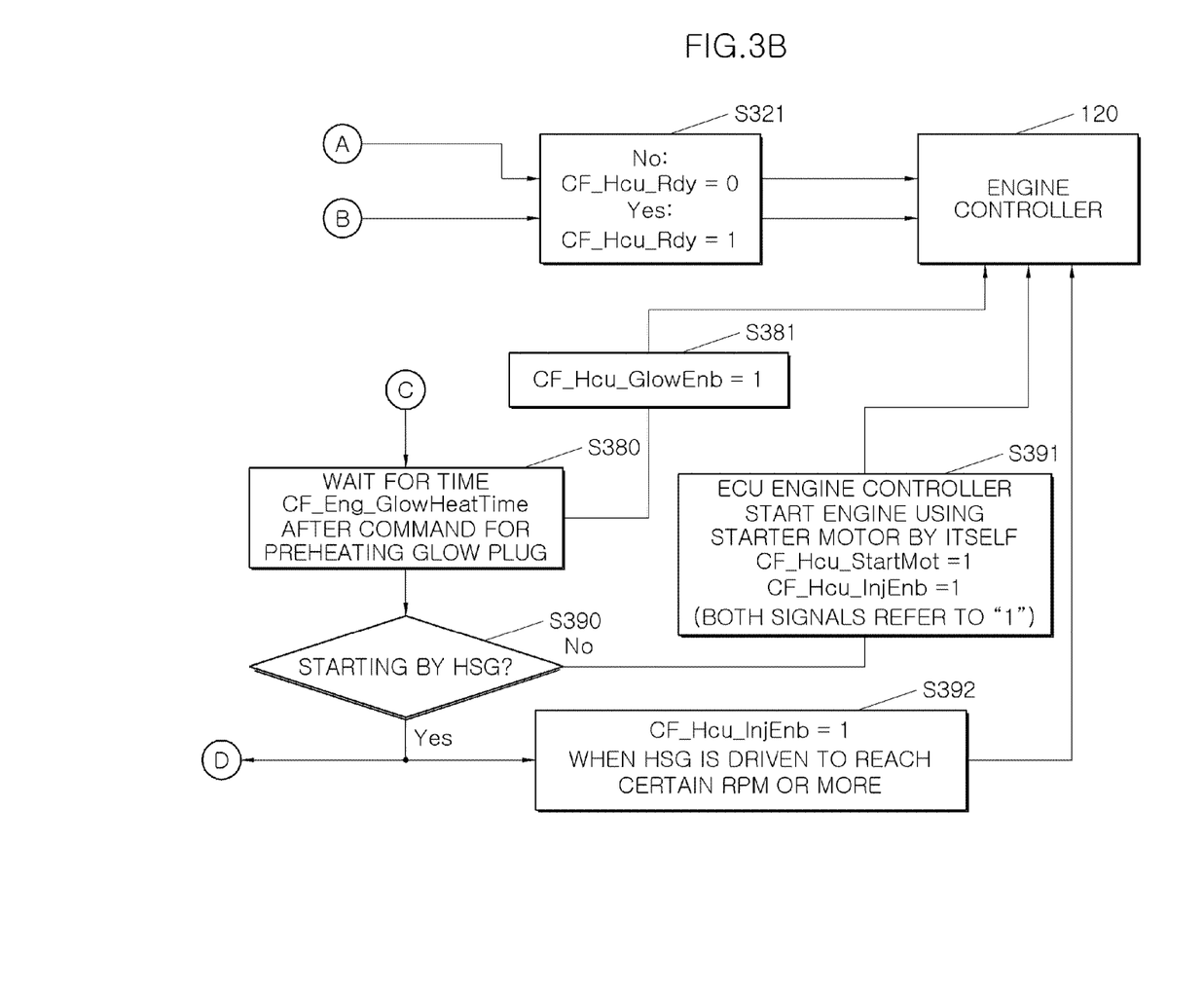

FIGS. 3A and 3B are flowcharts illustrating an engine start process performed by the hybrid controller illustrated in FIG. 1. Referring to FIGS. 3A and 3B, when the driver starts the ignition, the hybrid controller (110 in FIG. 1) checks whether communication with the engine controller 120 is normally feasible, generates information on whether the hybrid controller is normal according to the checked result, and transmits the information to the engine controller 120 (steps S310, S320, and S321). In other words, the information refers to "CF_Hcu_Rdy=1" when the hybrid controller 110 is determined to be normal, and the information refers to "CF_Hcu_Rdy=0" when the hybrid controller 110 is determined not to be normal.

After an IG signal is input according to when the ignition is turned on, it is determined whether a certain time (e.g. about 150 ms) elapses (step S330). When the certain time is determined to elapse, the process checks information, on whether the startup of the engine is prepared, which is transmitted from the engine controller 120 (step S340). In other words, the information refers to "CF_Eng_RdyStat=1" when the startup of the engine (121 in FIG. 1) is determined to be prepared, and the information refers to "CF_Eng_RdyStat=0" when the startup of the engine is determined not to be prepared.

When the startup of the engine is determined not to be prepared in step S340, the hybrid controller 110 turns on a malfunction indication lamp, and determines whether the start signal is input from the driver (steps S341 and S360).

When the start signal is determined to be input in step S360, the hybrid controller causes the vehicle to be driven only in the EV mode (step S361). In other words, since the vehicle may not be driven by the engine 121, the state information of the hybrid controller 110 refers to "CF_Hcu_HevRdy=1" such that the vehicle is driven only by the motor 131. In this case, the vehicle is operated in a limp-home mode so as to be driven to the minimum only by the motor 131, the motor controller 130, and the hybrid controller 110.

When the startup is determined to be prepared in step S340, the state information of the hybrid controller 110 is set to be "CF_Hcu_HevRdy=1" and it is determined whether the vehicle is driven in the EV mode (steps S351 and S370).

When the vehicle is determined to be driven in the EV mode in step S370, the process proceeds to step S361. When the vehicle is determined to be not driven in the EV mode in step S370, it is necessary to start the engine 121. Therefore, the engine waits for the preheating time transmitted from the engine controller 120 after the command for preheating the glow plug, and a preheating permission command (CF_Hcu_GlowEnb=1) is transmitted to the engine controller 120 (steps S380 and S381). In other words, when the ignition is turned on, the engine controller 120 calculates the preheating time (CF_Ems_GlowTime) for preheating the glow plug using the glow unit (210 in FIG. 2). The preheating time is transmitted from the engine controller 120.

Next, the hybrid controller 110 determines whether the engine 121 is started using the HSG (150 in FIG. 2) (step S380). When the engine is determined to be started using the HSG 150 in step S380, the hybrid controller 110 transmits a fuel injection command (CF_Hcu_InjEnb) to the engine controller 120 when the starter driver 220 drives the HSG 150 so that the HSG reaches a certain RPM (revolution per minute). In other words, the hybrid controller 110 permits the engine controller 120 to perform fuel injection.

On the other hand, when the engine is determined not to be started using the HSG 150 in step S380, the engine controller 120 transmits a starter motor execution command (CF_Hcu_StartMot=1) by itself such that the engine is started by the starter motor (250 in FIG. 2), and the hybrid controller 110 transmits a fuel injection command (CF_Hcu_InjEnb) to the engine control 120 (step S391). Thus, the engine controller 120 simultaneously performs the driving of the starter motor 250 and the fuel injection.

Figure 4A:
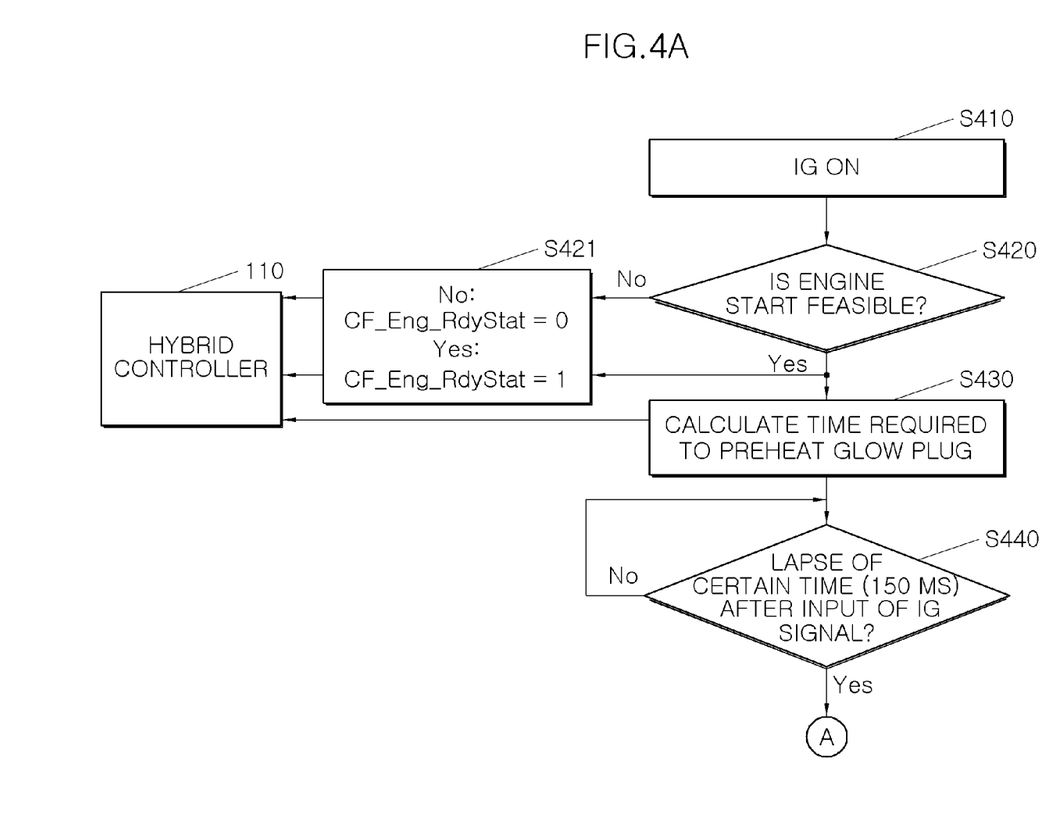
FIGS. 4A and 4B are flowcharts illustrating an engine start process performed by the engine controller in connection with the hybrid controller illustrated in FIG. 1.
Figure 4B:
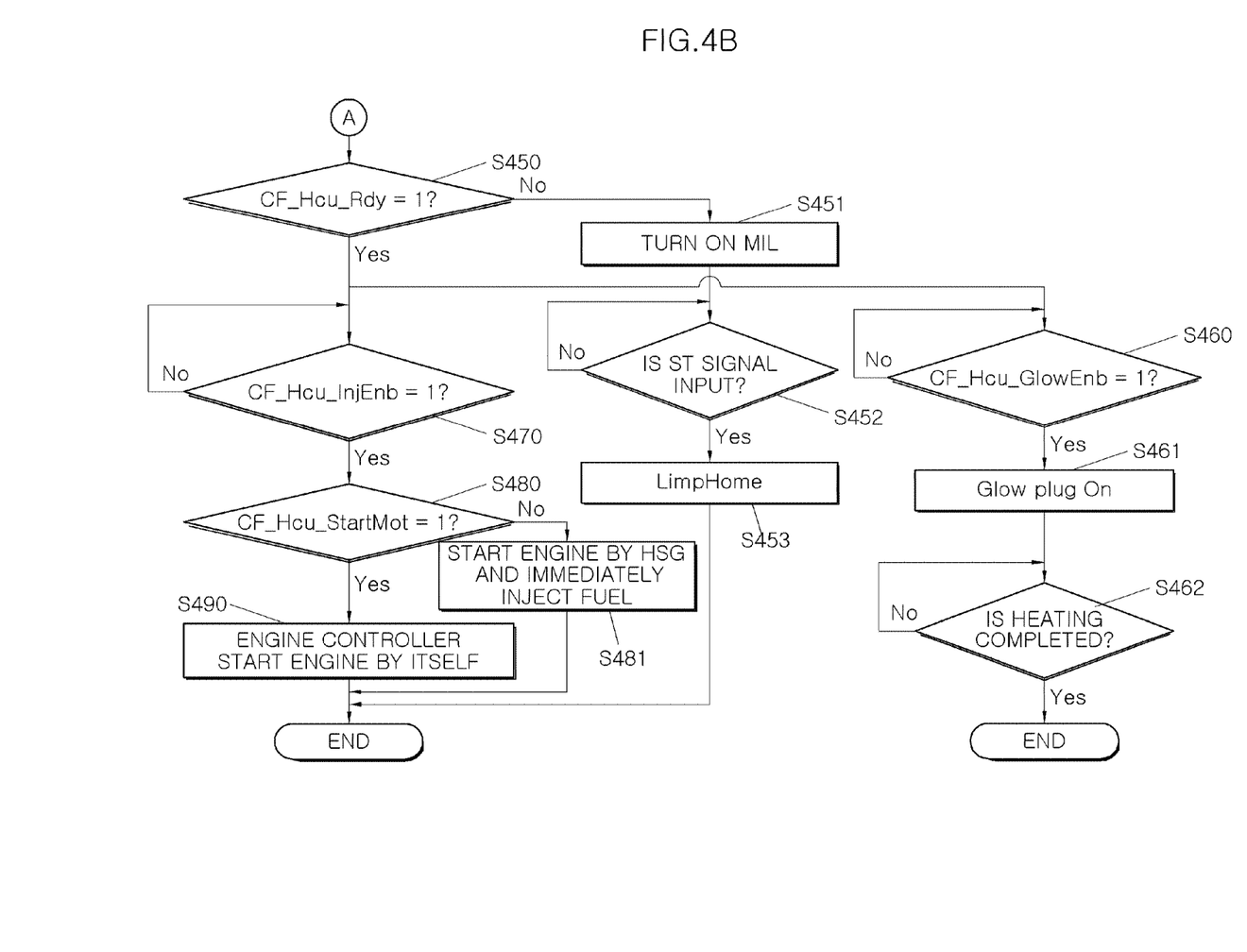

FIGS. 4A and 4B are flowcharts illustrating an engine start process performed by the engine controller in connection with the hybrid controller illustrated in FIG. 1. Referring to FIGS. 4A and 4B, when the ignition is turned on, the engine controller checks whether the startup of the engine (121 in FIG. 1) is prepared so as to generate information on whether the startup is prepared, and transmits the same to the hybrid controller 110 (steps S410, S420, and S421). In other words, the information refers to "CF_Eng_RdyStat=1" when the startup is determined to be prepared by the engine controller 120, and the information refers to "CF_Eng_RdyStat=0" when the startup is determined to be not prepared.

Next, the engine controller 120 calculates the preheating time required to preheat the glow plug using the glow unit 210, and transmits the preheating time (CF_Eng_Glow Heat Time) to the hybrid controller 110 (step S430).

Next, when a certain time (e.g. about 150 ms) elapses after the ignition is turned on, it is determined whether the hybrid controller 110 is normal (steps S440 and S450).

When the hybrid controller 110 is determined not to be normal in step S450, the malfunction indication lamp is turned on (step S451). When the start signal is input by the driver's key, the vehicle is driven in the limp-home mode in which the engine (121 in FIG. 1) is idle (step S453). In other words, the vehicle is driven only by the engine controller 120 and a Transmission Controller (TCU).

When the hybrid controller 110 is determined to be normal in step S450, it is checked whether a fuel injection command is present (step S470). That is, when the fuel injection command refers to "CF_Hcu_InjEnb=1", it is checked whether a starter motor execution command (CF_Hcu_StartMot=1) is executed (step S480).

When the starter motor execution command is determined to be executed in step S480, the engine controller 120 operates the starter motor (250 in FIG. 2) by itself so as to start the engine (step S490). On the other hand, when the starter motor execution command is determined not to be executed in step S480, the engine controller 120 causes the engine 121 to be started using the HSG 150 and simultaneously performs fuel injection (step S481).

When the hybrid controller 110 is determined to be normal in step S450, it is checked whether a preheating permission command is executed through the glow unit (210 in FIG. 2) (step S460). In other words, when the preheating permission command (CF_Hcu_GlowEnb=1) is received from the hybrid controller 110, the preheating is performed using the glow unit 210 (steps S460, S461, and S462).

In accordance with the exemplary embodiments in the present disclosure, it is possible to cope with strict regulations of fuel economy by accurately defining a startup sequence and clarifying the order and role of engine startup.

In addition, it is possible to determine whether an engine start failure is caused by a starter motor or an HSG.

Moreover, since an engine is not driven when a vehicle travels in an EV mode, it is possible to protect components and efficiently wait for the engine.

Furthermore, it is possible to perform automatic control in order for a driver to require little attention, and to meet the needs and/or expectations of customers by enhancing the qualities of the product relating to the engine startup of a hybrid vehicle.

While the present invention has been described with respect to the specific embodiments, it will be apparent to those skilled in the art that various changes and modifications may be made without departing from the spirit and scope of the invention as defined in the following claims.

What is claimed is:

1. An apparatus for controlling a startup of an engine, comprising:
   an engine;
   an engine controller configured to check whether the startup of the engine is prepared to generate information on whether the startup is prepared when an ignition is turned on;
   a hybrid controller configured to check whether communication with the engine controller is normal and to generate information on whether the hybrid controller is normal, the hybrid controller causing a vehicle to be driven only in an EV mode or generating a start control signal for the startup of the engine according to whether the EV mode is engaged when a start signal is input from a driver;
   an HSG;
   a starter motor; and
   a starter driver configured to start the engine in response to the start control signal,
   wherein the starter driver starts the engine through the HSG or the starter motor, and the starter motor is operated by the engine controller automatically when the HSG breaks down, and
   the engine controller and the hybrid controller exchange the information on whether the startup is prepared and the information on whether the hybrid controller is normal with each other, and perform cooperative control therebetween.

2. The apparatus of claim 1, wherein the hybrid controller causes the vehicle to be driven only in the EV mode when the startup of the engine is determined not to be prepared according to the information on whether the startup is prepared and the start signal is input.

3. The apparatus of claim 1, wherein the hybrid controller turns on a malfunction indication lamp when the startup of the engine is determined not to be prepared according to the information on whether the startup is prepared.

4. The apparatus of claim 1, wherein the engine controller turns on the malfunction indication lamp when the hybrid controller is determined not to be normal according to the information on whether the hybrid controller is normal.

5. The apparatus of claim 1, further comprising a glow unit configured to preheat a glow plug provided in the engine for a preheating time calculated in response to the start control signal from the hybrid controller.

6. The apparatus of claim 1, wherein the starter motor is operated by control of the engine controller to start the engine, and the hybrid controller transmits a fuel injection command to the engine controller.

7. The apparatus of claim 1, wherein the hybrid controller transmits a fuel injection command to the engine controller when the engine reaches a predetermined RPM or more when the engine is started by the HSG.

8. The apparatus of claim 5, wherein the engine controller calculates the preheating time required to preheat the glow plug.

9. The apparatus of claim 1, wherein the HSG is operated and the engine controller simultaneously performs the operation of the HSG and fuel injection when the hybrid controller is normal and the starter motor is not operated.

10. The apparatus of claim 1, wherein the engine controller causes the vehicle to be driven in a limp-home mode in which the engine is idle when the hybrid controller is determined not to be normal and the start signal is input.

11. A method for controlling a startup of an engine, comprising steps of:
providing an HSG and a starter motor;
checking, by an engine controller, whether a startup of an engine is prepared to generate information on whether the startup is prepared when an ignition is turned on;
checking whether communication between a hybrid controller and the engine controller is normally executed;
generating information on whether the hybrid controller is normal, and determining whether a start signal is input from a driver;
determining whether an EV mode is engaged when the start signal is determined to be input;
driving a vehicle only in the EV mode when the EV mode is determined not to be engaged;
generating a start control signal for starting the engine by the hybrid controller when the EV mode is determined not to be engaged; and
starting the engine in response to the start control signal by a starter driver,
wherein the starter driver starts the engine through the HSG or the starter motor, and the starter motor is operated by the engine controller automatically when the HSG breaks down, and
the engine controller and the hybrid controller exchange the information on whether the startup is prepared and the information on whether the hybrid controller is normal with each other, and perform cooperative control therebetween.

12. The method of claim 11, wherein the step of driving the vehicle only in the EV mode comprises driving the vehicle only in the EV mode by the hybrid controller when the startup of the engine is determined not to be prepared and the start signal is input.

13. The method of claim 11, wherein the step of driving the vehicle only in the EV mode comprises turning on a malfunction indication lamp by the hybrid controller when the startup of the engine is determined not to be prepared, or turning on the malfunction indication lamp by the engine controller when the hybrid controller is determined to be abnormal.

14. The method of claim 11, wherein the step of generating the start control signal comprises preheating a glow plug provided in the engine for a preheating time calculated by a glow unit in response to the start control signal from the hybrid controller.

15. The method of claim 11, wherein the starter motor is operated by control of the engine controller to start the engine, and the hybrid controller transmits a fuel injection command to the engine controller.

16. The method of claim 11, wherein the hybrid controller transmits a fuel injection command to the engine controller when the engine reaches a predetermined RPM or more when the engine is started by the HSG.

17. The method of claim 14, wherein the step of checking whether the startup of the engine is prepared comprises calculating the preheating time required to preheat the glow plug by the engine controller.

18. The method of claim 11, wherein the HSG is operated and the engine controller simultaneously performs the operation of the HSG and fuel injection when the hybrid controller is normal and the starter motor is not operated.

19. The method of claim 11, wherein the engine controller causes the vehicle to be driven in a limp-home mode in which the engine is idle when the hybrid controller is determined to be abnormal and the start signal is input.

* * * * *